United States Patent
Totah et al.

(10) Patent No.: US 11,050,570 B1
(45) Date of Patent: Jun. 29, 2021

(54) INTERFACE AUTHENTICATOR

(71) Applicant: Amazon Technologies, Inc., Seattle, WA (US)

(72) Inventors: John Totah, Half Moon Bay, CA (US); Frank Charles Paterra, Kirkland, WA (US); Stephen Wayne McKissick, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 16/198,668

(22) Filed: Nov. 21, 2018

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0844* (2013.01); *H04L 9/3215* (2013.01); *H04L 9/3236* (2013.01); *H04L 9/3268* (2013.01); *H04L 9/3271* (2013.01); *H04L 63/0428* (2013.01); *H04W 12/06* (2013.01); *H04L 2209/80* (2013.01)

(58) Field of Classification Search
CPC . H04L 9/3247; H04L 63/0428; H04L 9/3236; H04L 9/0844; H04L 9/3268; H04L 9/3215; H04L 9/3271; H04L 2209/80; H04W 12/06
See application file for complete search history.

(56) References Cited

U.S. PATENT DOCUMENTS

2002/0178385 A1* 11/2002 Dent .................. H04L 63/108
726/27
2005/0273850 A1* 12/2005 Freund .............. H04L 63/0227
726/14
(Continued)

FOREIGN PATENT DOCUMENTS

EP           1496418 A2 *  1/2005  ........... G06F 21/606

OTHER PUBLICATIONS

"Software Protection Dongle," Wikipedia, The Free Encyclopedia, Jul. 6, 2019, <https://en.wikipedia.org/wiki/Software_protection_dongle> [retrieved on Aug. 1, 2019], 4 pages.

*Primary Examiner* — Joseph P Hirl
*Assistant Examiner* — Ka Shan Choy
(74) *Attorney, Agent, or Firm* — Davis Wright Tremaine LLP

(57) ABSTRACT

The ability to submit and execute secured commands on a device is controlled using an interface authenticator. The interface authenticator includes a processor and physical memory that stores key material. When the interface authenticator is connected to the device the device communicates with the interface authenticator to cryptographically verify that the interface authenticator is valid. If the interface authenticator is valid, the device allows controlled commands to be received. In some examples, the controlled commands are obtained via a sideband data channel pass-through access and executed on a management controller within the device. In some examples, as a result of determining that the interface authenticator is valid, a sideband data channel pass-through access is enabled over which both privileged and uncontrolled commands may be received.

20 Claims, 9 Drawing Sheets

(51) Int. Cl.
*H04W 12/06* (2021.01)
*H04L 9/08* (2006.01)

(56) References Cited

U.S. PATENT DOCUMENTS

| | | | |
|---|---|---|---|
| 2013/0290735 A1* | 10/2013 | Rombouts | G06F 21/33 713/189 |
| 2015/0082396 A1* | 3/2015 | Theebaprakasam | G06F 21/604 726/5 |
| 2016/0189151 A1* | 6/2016 | He | H04L 9/3215 705/75 |

* cited by examiner

INTERFACE AUTHENTICATOR

BACKGROUND

The configuration and management of computing devices can be a difficult problem. In general, many devices must be configured and secured before they are managed and used in an operational environment. During configuration, some devices use a factory default password that should be replaced with new credentials before deployment and use. For example, a consumer Wi-Fi router may need to be configured to provide network addresses to computer systems within a home network, and have security parameters managed to secure the Wi-Fi network from unauthorized access, before the Wi-Fi router is connected to the Internet. In some examples, a consumer may perform configuration of a device, but in other examples, configuration and management of a device is restricted to an automated configuration client process performed by an authorized administrator or system manager. Securing access to the configuration process is an important problem.

BRIEF DESCRIPTION OF THE DRAWINGS

Various techniques will be described with reference to the drawings, in which.

DETAILED DESCRIPTION

Figure 1:
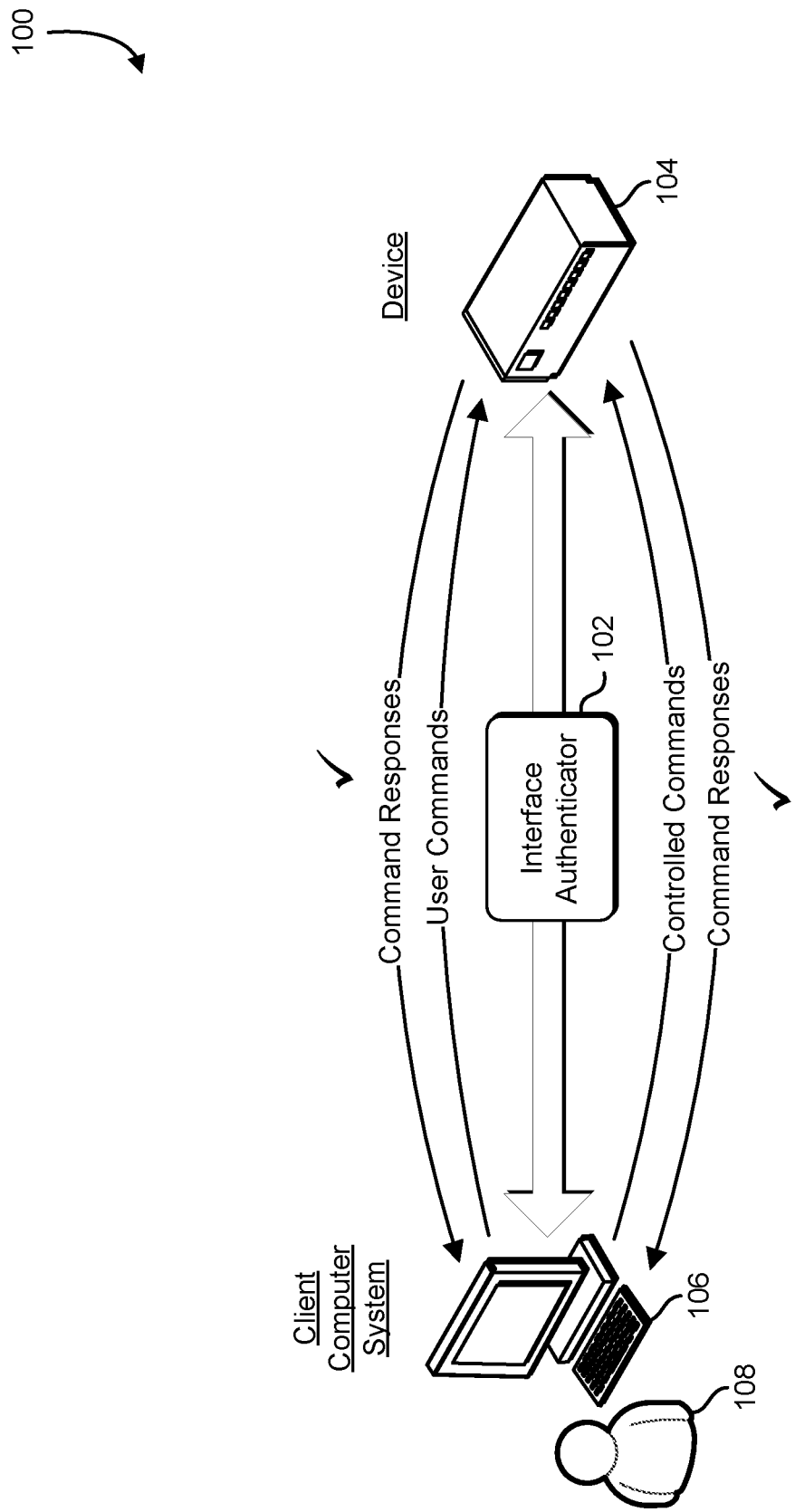
FIG. 1 illustrates an example of a network connection with an interface authenticator ("IA") that allows secured commands to be provided to a device, in an embodiment.

The present document describes an interface authenticator that, as a result of being connected to a device, enables a controlled set of commands to be provided to and executed by a device. The interface authenticator can take a variety of forms such as a cable or wireless interface that facilitates communication between a client computer system and the device. In one example, the interface authenticator is a controlled sideband interface authenticator ("interface authenticator") that uses a challenge-response authentication protocol with encryption keys to enable (unlock, activate, turn on, switch on or open) sideband data channel pass-through access that allows subsequent authorization controls for the submission and performance of controlled commands on the device. In an embodiment, the interface authenticator includes an integrated circuit chip with a cryptographic processor and protected memory that stores a digitally signed certificate and a corresponding public/private encryption key pair for an authentication engine. In some examples, an authentication engine provides true random number generation, signing algorithms, hashing algorithms, and a secure challenge-response protocol using the Elliptic Curve Digital Signature Algorithm ("ECDSA") authentication scheme. When the interface authenticator is connected to the device, a management controller or a Security Controller ("SC") within the device performs an authentication process wherein the MC or the SC within the device validates the interface authenticator and, as a result, enables a sideband data channel over which controlled and/or uncontrolled commands can be received by the device. In various examples, the validation process may also perform authentication, verify the validity period of the interface authenticator at the time of use, and check the current revocation status. In the present document, controlled commands are commands that are restricted to a subset of privileged users or administrators, system managers, or automated provisioning service clients. Controlled commands may also be referred to as privileged commands or secured commands. The present document may also refer to uncontrolled, non-privileged, or unsecured commands that are available to general users and administrators alike. In some implementations, the automated provisioning service client, administrator or system manager may authenticate with additional credentials from the client computer system over the sideband data channel to the MC within the device before authorized access is permitted to execute controlled commands on the device. For example, controlled commands may be device management commands generally performed by an administrator, or device configuration commands generally executed by an automated provisioning service client. In various examples, the controlled commands may include firmware update commands, host reconfiguration commands, and commands that affect the boot sequence of a computer system. In some examples, if the validation process fails, or if an invalid interface authenticator is used to connect to the device, the device issues an alarm and halts execution of all processes. In some examples, if an error during the validation process is not a critical security failure, the device may continue to operate without an interface authenticator in a controlled safe mode, requiring that a sideband data channel is not enabled and attempts to send controlled commands will not be received by the device. In various examples, the interface authenticator provides both physical and logical controls to prevent ordinary users from accessing the MC and prevents attempted attacks from reaching the MC through the device's network controller ("NC").

In various examples, the interface authenticator is attached to or embedded within a fiber-optic or copper interface cable module that connects the device to a network for access by the client computer system. In some examples, the device is a storage appliance, server, or network device. In some embodiments, some or all of the connections between the device and the client computer system may be wireless. For example, the network connection may be over a wireless interface such as a Bluetooth, Wi-Fi, radio frequency, or infrared adapter that plugs the interface authenticator into a USB port or other physical port on the device, and the client computer system may connect to the device via the wireless interface that is paired with a second interface authenticator plugged in to the client computer. In some implementations, the interface authenticator includes a processor and memory housed within a cable module storing executable instructions that, when executed by the processor, cause the MC or the SC within the device to validate the interface authenticator. In some examples, the processor and memory may be a cryptographic processor with protected storage for encryption keys such as the Maxim Integrated Products, Inc., DS28C36 authenticator, the NXP Semiconductors N.V. A1006 authenticator, or the Microchip Technology, Inc., ATECC608A authenticator. In some examples, the interface authenticator may include a secure element such as a cryptographic processor, trusted platform module, tamper resistant memory that prevents exporting private encryption key material, or microprocessor chip capable of running secure applications. A sideband data channel is a secondary communication channel associated with a primary communication channel, and a sideband data channel may be implemented as a logical communication channel over a physical interface, a secondary physical data channel of wired interface, or a designated portion of bandwidth over a wireless communication medium. In some examples, the sideband data channel is implemented to comply with the Network Controller Sideband Interface ("NC-SI") specification. NC-SI is an electrical interface and protocol defined by the Distributed Management Task Force ("DMTF"), which enables the connection of a Baseboard Management Controller ("BMC") to a set of Network Interface Controllers ("NICs") in server computer systems for the purpose of enabling out-of-band remote manageability. In one implementation, the BMC uses the sideband data channel for the NC-SI OEM Command (0x50) packet format to send and receive both read and write commands between the BMC and the ECDSA challenge-response authenticator attached to or embedded within a cable module using an Inter-Integrated Circuit ("I²C") interface. I²C is a synchronous, multi-master, multi-slave packet switched serial bus. For example, the interface authenticator may be an integrated circuit chip embedded within a cable module using an I²C 4-bit serial data channel. In many examples, the I2C serial bus between the BMC and the interface authenticator is a separate sideband data channel from the out-of-band remote management channel between the BMC and the client computer system on a network.

In one implementation, a device manufacturer produces a device with interface authenticator equipped management cables. The device manufacturer supplies a provisioning system for the owner to configure the interface authenticator and manage the access controls to validate network connections for authorized MC pass-through traffic via the NC of the device. The provisioning system provides security services to create a system-specific trusted Certificate Authority ("CA") for asymmetric cryptographic schemes that establish a root of trust with a digitally signed certificate corresponding to the interface authenticator public/private encryption key pair. The interface authenticator is configured and managed by the owner to determine the interface authenticator validity for a device or a group of devices. In one implementation, when an interface authenticator is connected to a device, the device detects the presence of an interface authenticator, the device verifies that the interface authenticator public encryption key, digitally signed certificate and digitally signed certificate chain is valid using the public encryption key of the owner's trusted CA for the specific system where the device is approved for use, and the device uses a challenge-response protocol confirming that the interface authenticator's private encryption key corresponds with the interface authenticator's public encryption key and digitally signed certificate. The device checks the status of the interface authenticator in the CA's revocation system. In this way, the device verifies that the interface authenticator is valid and enables a sideband data channel for sending commands to the MC within the device. In some examples, a sideband data channel may be implemented to comply with the NC-SI specification for the purpose of receiving controlled commands to configure and manage the MC within the device from external client computer systems. In some examples, a sideband data channel may permit only controlled commands when using a valid interface authenticator, and if an interface authenticator is not used, then only uncontrolled commands may be permitted. In some examples, symmetric cryptographic schemes with a shared secret, a truly random cryptographic nonce, and a secure digital hash algorithm are used for a challenge-response authentication protocol.

In order to facilitate configuration, many devices implement a configuration console or a network management channel. Some devices implement a Management Controller ("MC") and an out-of-band communication channel that is a sideband data channel accessed using pass-through traffic through a Network Controller ("NC") network interface port. Restricting access to the MC within the device for infrequent configuration and management is a more difficult security problem when the device's NC is connected to an uncontrolled network or is physically located where unauthorized MC access attempts are expected. In some examples, a device may require access to the MC only when connected to a closed network environment in a physically controlled location before it is sent to another location for use with the device's NC on a different network with unrestricted or otherwise unknown physical security.

As one skilled in the art will appreciate in light of this disclosure, certain embodiments may be capable of achieving certain advantages, including some or all of the following: (1) physically removing an attack vector by rendering inoperative the communication channel over which controlled commands may be submitted, (2) providing a physical access token that provides improved security for the device, and (3) further improving security by restricting the physical path over which controlled commands can be transmitted to the device.

FIG. 1 illustrates an example of an interface authenticator that allows controlled commands to be performed by a device, in an embodiment. In the example 100 shown in FIG. 1, an interface authenticator 102 connects a device 104 to a client computer system 106. The client computer system is operated by a user 108. The client computer system 106 can be a personal computer system, server computer system, handheld device, cellular phone, smart watch, laptop computer system, embedded controller, or physical computing device having a physical network interface compatible with an interface authenticator 102. The device 104 can be a storage device, disk drive, printer, network device, router, switch, hardware security module, cell phone, handheld device, or computing device having a physical network interface compatible with an interface authenticator 102. The interface authenticator 102 is attached to a network interface that may facilitate a wired, fiber-optic, infrared, radiofrequency, or wireless communication link between the device 104 and the client computer system 106.

In various examples, the interface authenticator is embedded in or attached to a serial cable, parallel cable, Ethernet cable, network cable, fiber-optic cable, FireWire cable, USB cable, or lightning cable. In some examples, an interface authenticator 102 may be comprised of a pair of paired wireless network adapters that communicate with each other to establish the communication link between the device 104 and the client computer system 106. For example, an interface authenticator 102 may be comprised of a first Bluetooth adapter and a second Bluetooth adapter that are paired with each other, and communication between the client computer system 106 and the device 104 is facilitated by wireless transmissions between the first Bluetooth adapter and the second Bluetooth adapter. An interface authenticator 102 includes processor and protected memory containing instructions that, as a result of being executed by the processor, cause the interface authenticator to communicate with the device 104 and execute a validation process with the device 104. In various examples, an interface authenticator 102 includes cryptographic information such as a digitally signed certificate or encryption key material to verify the authentication credentials in the validation process. In some implementations, the cryptographic information may be stored in protected memory that is resistant to physical tampering and may prevent the export of private encryption key material. In some examples, the cryptographic information is highly entropic, immutable and cannot be copied, cloned, moved, or removed. In some implementations, the processor and the memory are provided in the form of a cryptographic processor.

In one example, when an interface authenticator 102 is connected to the device 104, the device 104 and an interface authenticator 102 perform a cryptographic process that allows the device 104 to cryptographically verify the validity of an interface authenticator 102. In some examples, an interface authenticator 102 provides the device 104 with a digitally signed certificate that corresponds to the public encryption key. The validity of the digitally signed certificate is checked by verifying a digital signature on the certificate chain's signature using a system-specific signer's trusted Certificate Authority ("CA") public encryption key stored on the device 104. The interface authenticator 102 generates a digital signature of a highly entropic challenge nonce sent by the device with a private encryption key corresponding with the public encryption key and digitally signed certificate and provides the digital signature as a response to the device 104. By validating the digital signature provided by an interface authenticator 102, the device 104 can check the revocation status to be reasonably sure that the interface authenticator is valid. Based on the cryptographic authentication scheme, the device 104 can determine that an interface authenticator 102 is valid for operational use with the device 104 at the time of the verification check.

In some examples, as a result of determining that an interface authenticator 102 is valid, the device 104 may enable various management features, controlled commands, and additional command channels. In some examples, the device enables controlled commands to be performed on the device. For example, a storage appliance may allow disk drives to be formatted, securely erased, or have low-level parameters adjusted. A hardware security module may allow keys to be erased or reset. In other examples, additional communication channels are opened between the device 104 and the client computer system 106. In one implementation, the device 104 enables a sideband data channel between the device 104 and the client computer system 106. In another implementation, the device 104 enables a secondary logical connection between the device 104 and the client computer system 106. In some implementations, the device 104 may enable one or more physical interface pins connected via the network interface from the device 104 to the client computer system 106.

The device 104 may take a variety of actions if the interface authenticator is determined to not be valid. For example, the device may prevent all communication between the device 104 and the client computer system 106. In other examples, the device may allow uncontrolled commands to be submitted to and executed on the device 104, but not controlled commands. In some examples, the device 104 enables a standard communication link, such as an in-band data channel, between the device 104 and the client computer system 106, but does not enable any secondary communication channel, such as a sideband data channel or other secondary logical interfaces.

The interface authenticator 102 may be used intermittently by device owners, authorized service personnel, and system administrators for controlled access to various sensitive features and functions of the device 104. For example, a device owner might issue an interface authenticator to installation service personnel so that only authorized automated processes are permitted to access various features and functions of the device 104. The interface authenticator 102 provides token-based physical security and also allows the device 104 to logically remove or disable MC communication interfaces that would otherwise be accessible to an attacker.

Figure 2:
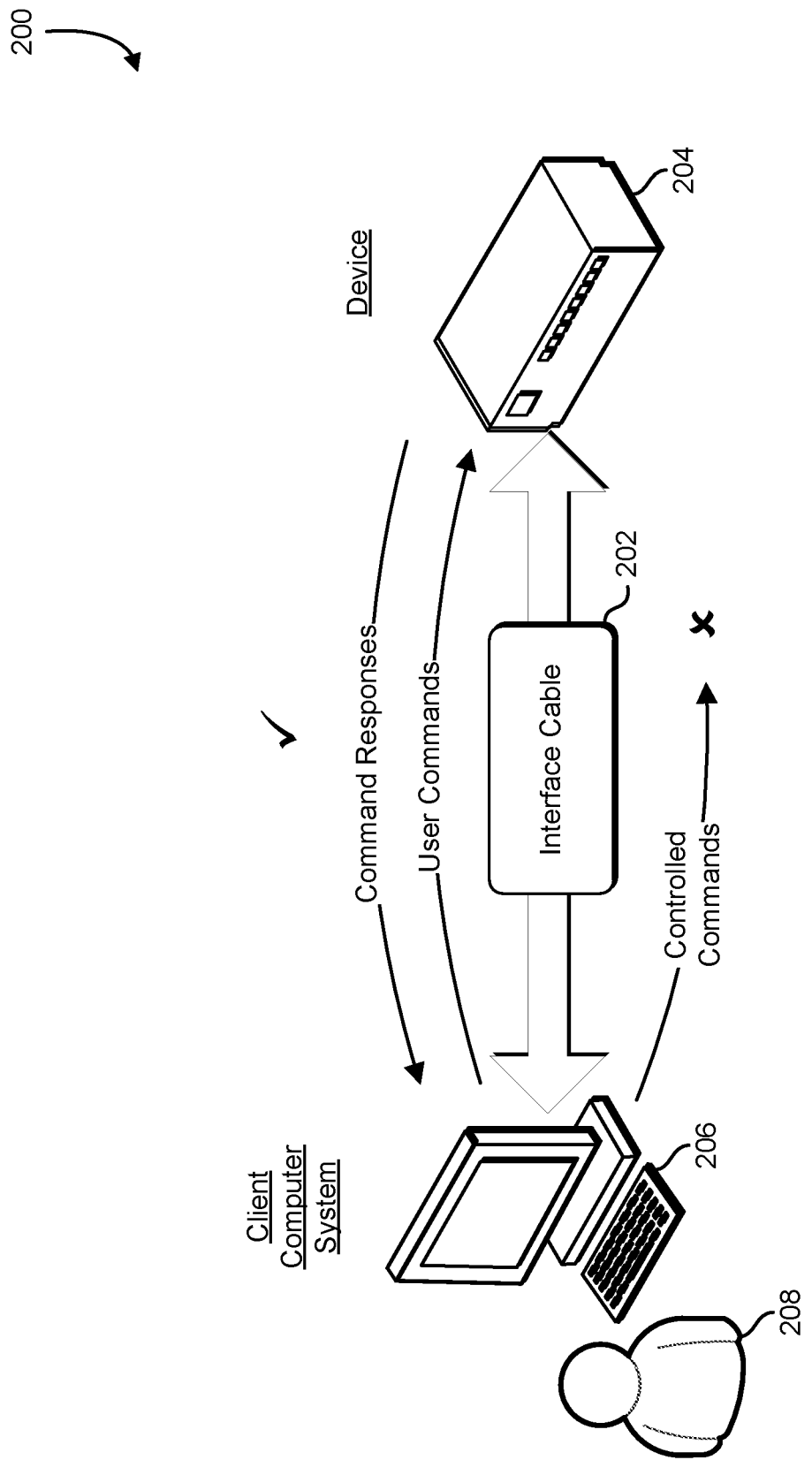
FIG. 2 illustrates an example of a network connection without an interface authenticator, in an embodiment.

FIG. 2 illustrates an example of a device interface that does not allow access to the MC within a device, in an embodiment. In the example 200 shown in FIG. 2, an interface 202 provides an in-band data channel between a device 204 and a client computer system 206. The client computer system is operated by a user 208. The client computer system 206 can be a personal computer system, server computer system, handheld device, cellular phone, smart watch, laptop computer system, embedded controller, or physical computing device having a physical interface compatible with the interface 202. The device 204 can be a storage device, disk drive, printer, network device, router, switch, hardware security module, cell phone, handheld device, or computing device having a physical interface compatible with the interface 202. The interface 202 is a data network that may facilitate a wired, fiber-optic, infrared, radio frequency, or wireless communication link between the device 204 and the client computer system 206.

In various examples, the interface 202 may be a cable or wireless communications link similar to the interface authenticator described above. In some examples, the interface 202 includes a cable or wireless network interface module as described above, but does not contain a secure element or a cryptographic processor with protected storage for encryption key material to enable authentication with a device 204. In one implementation, the interface 202 attempts to perform an authentication operation with the device 204. As a result of an unsuccessful authentication operation, the interface 202 operates as a normal in-band data channel that allows communication between the client computer system 206 and the device 204, but no sideband data channel is opened on the device 204 for communications with the device and no controlled commands are accepted by the device 204. In another implementation, as a result of an unsuccessful authentication operation, the interface 202 blocks all communication between the client computer system 206 and the device 204.

In one example, when the interface 202 is connected to the device 204, the device 204 attempts to authenticate with the interface 202. In many examples, the interface 202 does not contain a processor or memory, and does not provide communications with the MC within the device 204. As a result, the device 204 does not open an out-of-band communication channel that is a sideband data channel accessed using pass-through operations through a Network Controller ("NC") network interface port for receiving controlled commands, and does not allow controlled commands to be executed on the device 204. In some implementations, general purpose operating system commands, uncontrolled commands, or user commands may be transmitted from the client computer system 206 to the internal host interface of the device 204 via the interface 202. The routing of uncontrolled commands between the client computer system 206 and the device 204 may be called direct or in-band data channel communication with the internal host interface of the device 204. In some examples, controlled commands may not be transmitted to the device 204 via the interface 202 as the device 204 will not enable the interface for receiving said commands. In other examples, the device 204 may receive controlled commands, but the device 204 will not authorize the controlled commands to be executed due to the lack of authentication between the interface 202 and the device 204.

In some examples, the interface 202 may use an off-the-shelf network cable that is widely available to the public. For example, an interface authenticator attached to or embedded within a cable module may be provided by device manufacturers to be infrequently used by the device owner or authorized service personnel only when access to the MC is required. Network cables or wireless communications links without an interface authenticator may be obtainable by many users, and allow normal or direct in-band communication with the device 204.

Figure 3:
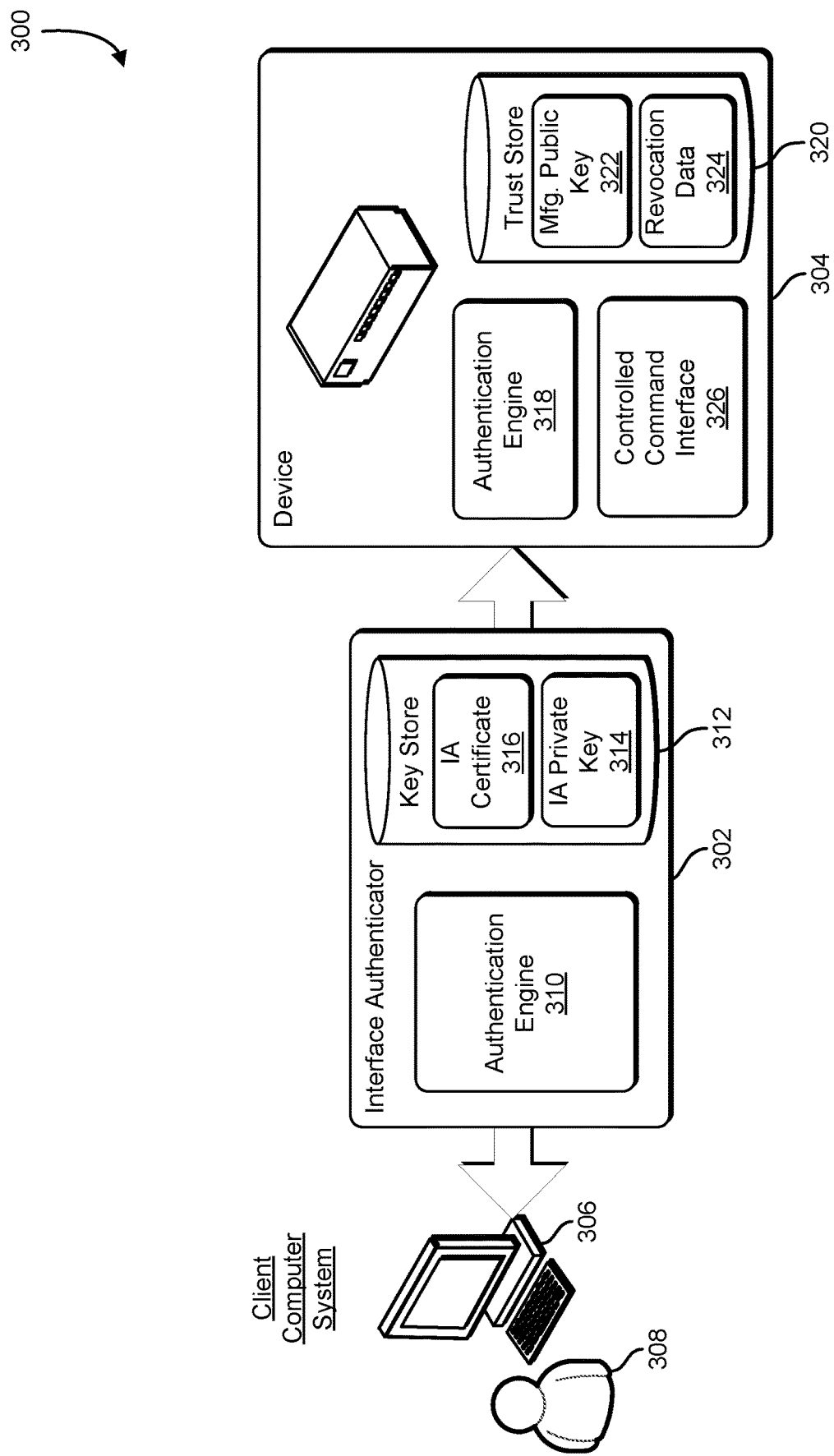
FIG. 3 illustrates an example of an interface authenticator that connects a client computer system to a device, in an embodiment.

FIG. 3 illustrates an example of an interface authenticator that connects a client computer system to a device that performs network access control enforcement, in an embodiment. In an embodiment, a system 300 includes an interface authenticator 302 that permits a device 304 to enable a communication link between a device 304 and a client computer system 306 operated by a user 308. The interface authenticator 302 can be attached to or embedded within a serial cable, a USB cable, a parallel cable, a network cable, an optical cable, a Lightning cable, an HDMI cable, an audio cable, an IEEE cable, or a power cable capable of sending and receiving data. The interface authenticator 302 includes a processor and protected memory storing executable instructions and encryption key material that, as a result of being executed by the processor, cause the interface authenticator 302 to implement an authentication engine 310 that communicates with the device 304 and executes a challenge-response authentication protocol. The authentication engine 310 accesses the interface authenticator encryption key store 312 that contains the interface authenticator private encryption key 314 and the interface authenticator digitally signed certificate 316 that corresponds with the interface authenticator public encryption key digitally signed by the signer's root of trust that was digitally signed by the trusted CA root. In some examples, the processor within the interface authenticator 302 is a cryptographic processor, and the interface authenticator encryption key store 312 is retained in tamper-resistant protected memory within the cryptographic processor. In some examples, the tamper-resistant protected memory includes controls to prevent memory copies, duplication, cloning or deletion on which the interface authenticator private encryption key 314 is stored. Tamper-resistant protected memory is memory allocated to a cryptographic processor whose contents may not be exported outside the cryptographic processor or secure element. In some examples, the MC within a device 304 uses a discrete SC that includes a cryptographic processor, tamper-resistant protected memory, encryption key store, and an authentication engine.

In an example, the device 304 includes a processor and memory storing executable instructions that, as a result of being executed by the processor, implement an authentication engine 318 and a controlled command interface 326. The authentication engine 318 accesses a trust store 320 that stores a system-specific root CA's public encryption key 322 and the corresponding CA's root certificate 324. The trust store 320 is a memory, storage device, database, or protected memory device that retains cryptographic information to identify, authenticate and validate interface authenticators trusted by the device 304. In some implementations, the information in the trust store 320 is written when provisioning the device 304. When the interface authenticator 302 is connected to the device 304, the authentication engine 310 in the interface authenticator 302 communicates with the authentication engine 318 embedded in the device 304, and a cryptographic authentication protocol executes to validate the interface authenticator 302 by the device 304. If the validation is successful, the device 304 enables a controlled command interface 326 that allows the device 304 to receive controlled commands that can be executed by the device. In some examples, the controlled command interface 326 is a sideband data channel application interface. In other examples, the controlled command interface 326 may be a logical port on a network interface of the device 304, and the logical port is opened to accept controlled commands as a result of the successful validation. In some examples, the controlled command interface 326 is a secondary communication channel between the client computer system 306 and the device 304. The secondary communication channel may be a logical channel (such as a TLS connection) or physical channel (such as a communication link on a particular set of physical pins of the cable).

In one implementation, when the interface authenticator 302 is connected to the device 304, the device 304 detects the presence of the interface authenticator 302 and requests a copy of the interface authenticator digitally signed certificate 316. The authentication engine 310 retrieves the interface authenticator digitally signed certificate 316 from the interface authenticator encryption key store 312 and provides the interface authenticator digitally signed certificate 316 to the authentication engine 318 on the device 304. The authentication engine 318 retrieves the system-specific root CA's public encryption key 322 from the trust store 320, and validates a digital signature on the digitally signed certificate to confirm that the digitally signed certificate is valid. In some embodiments, the authentication engine 318 uses the CA's root certificate 324 to verify the interface authenticator digitally signed certificate 316 that includes the signer's certificate in the certificate chain. If the digitally signed certificate is valid, the authentication engine 318 issues an entropic random challenge nonce message to the interface authenticator 302. The authentication engine 310 digitally signs the challenge nonce message using the interface authenticator private encryption key 314 and returns the resulting digitally signed response nonce message to the device 304. The authentication engine 318 on the device 304 confirms the validity of the digital signature using the random challenge nonce message and the public encryption key in the interface authenticator's digitally signed certificate. If the digital signature is verified, the device 304 checks the interface authenticator 302 validity period and current status in the CA's revocation system to determine if the interface authenticator 302 is valid. In some embodiments, the device 304 initially enables an out-of-band communication channel that is a sideband data channel using pass-through operations through a NC network interface port for a communication link between the MC or the SC within the device 304 and the CA's revocation system accessible from a client computer system 306. The initial enabling of the sideband data channel is the first step that only allows the MC to send a request over a communication link for a digitally signed message indicating the interface authenticator 302 validity period and current status. After the interface authenticator 302 is determined to be valid, the sequence continues enabling the sideband data channel pass-through access to the MC within the device 304.

In some embodiments, as a result of determining that the interface authenticator 302 is valid, the device 304 enables a controlled command interface 326 that allows the receipt of controlled commands. In some examples, the device 304 enables the execution of commands that would otherwise be disabled on the device. Examples of commands that may be enabled on the device may include manufacturers' specific commands used by service personnel, commands that would allow the platform firmware to be updated, or commands that would format a storage device. By disabling these commands when an interface authenticator is not present, and in some embodiments disabling the communication path that controlled commands are sent through, the security of the device 304 is improved.

Figure 4:
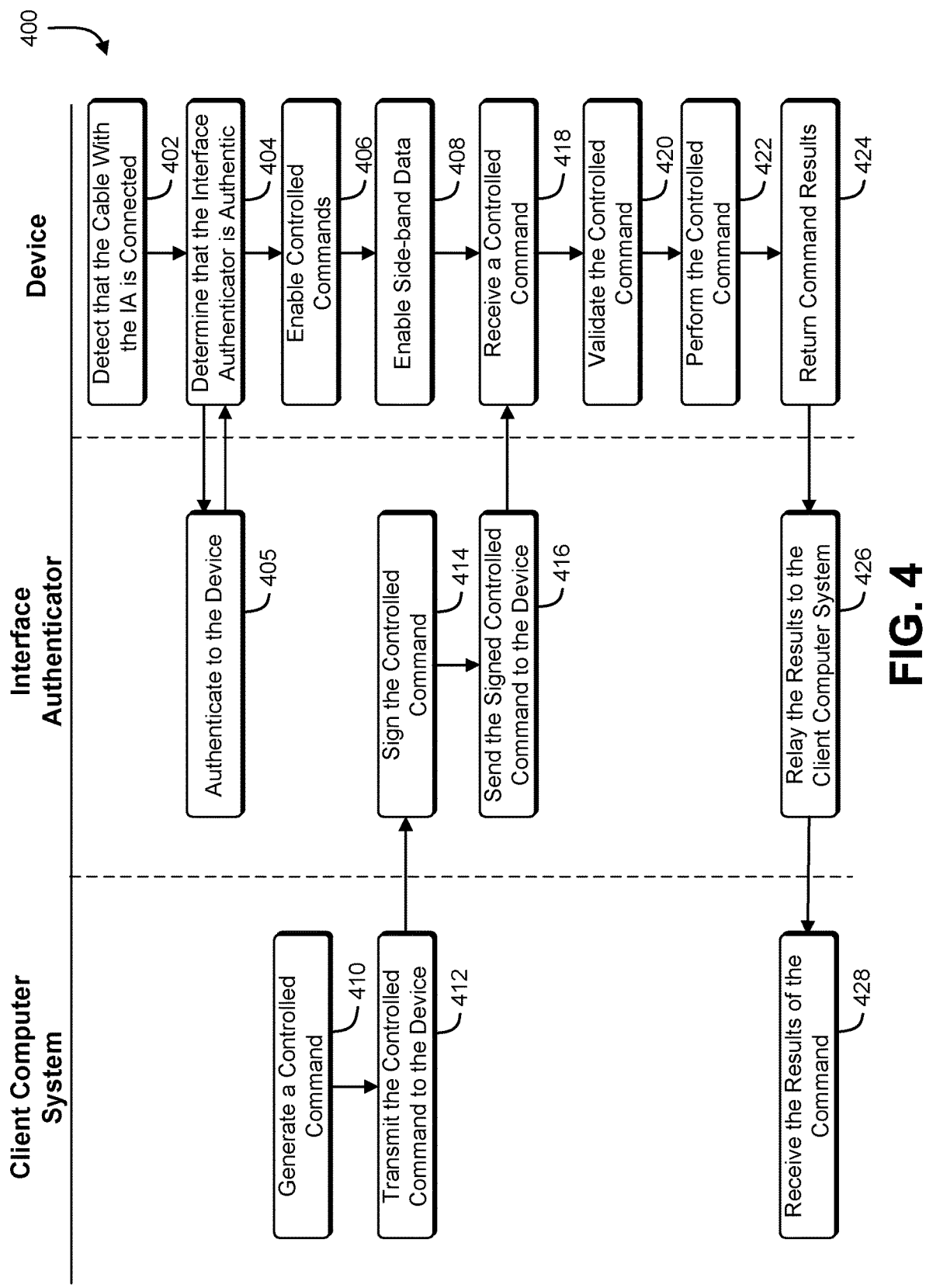
FIG. 4 illustrates an example of a process that, as a result of being performed by a client computer system, an interface authenticator, and a device, enables and performs a controlled command submitted by the client computer system, in an embodiment.
Figure 6:
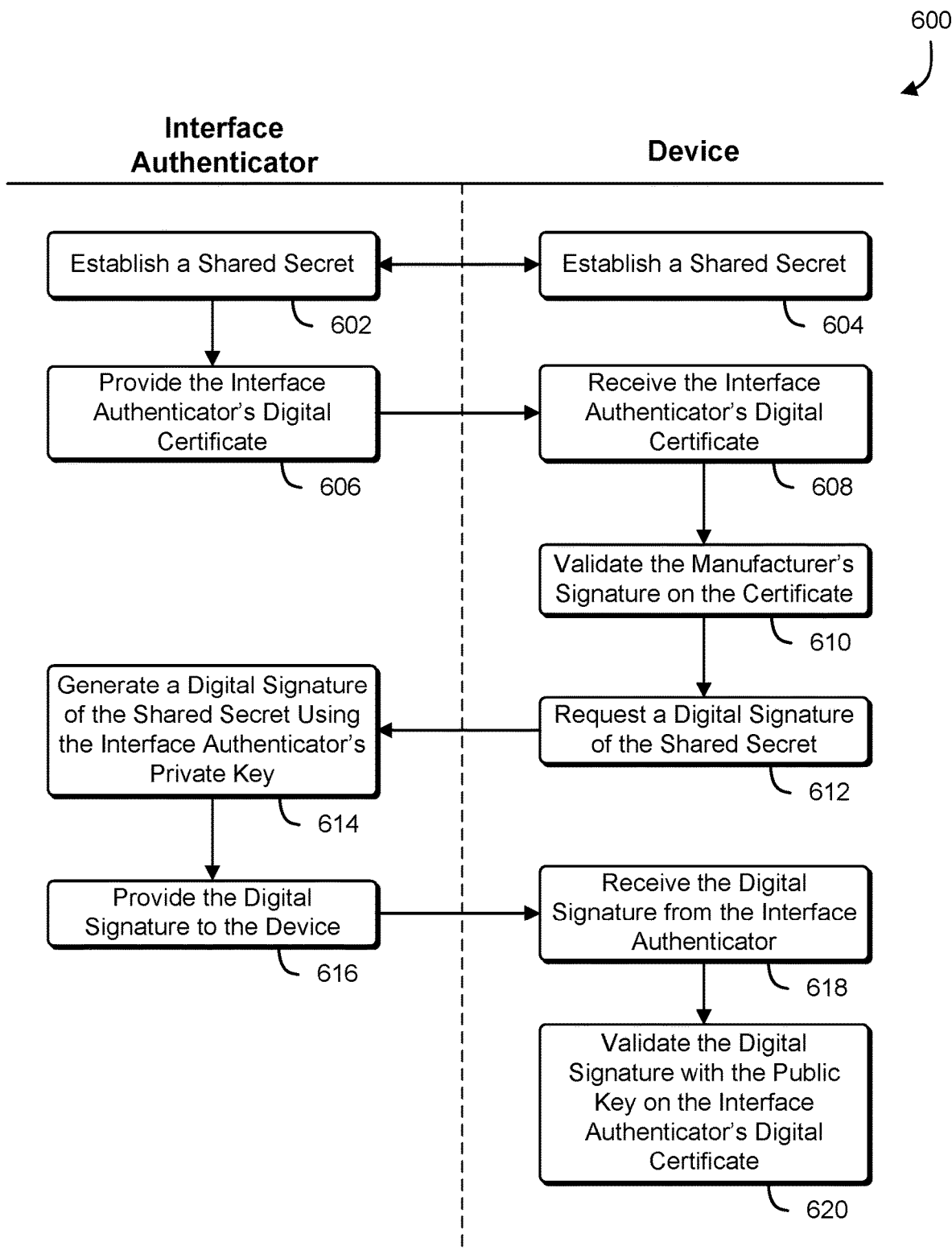
FIG. 6 illustrates an example of a process that, as a result of being executed by an interface authenticator and a device, authenticates the IA with the device and verifies that the IA is valid, in an embodiment.

FIG. 4 illustrates an example of a process that, as a result of being performed by a client computer system, an interface authenticator, and a device, executes a controlled command submitted by the client computer system, in an embodiment. In an embodiment, a process 400 begins at block 402 with an interface authenticator connecting to the device. At block 404, the device detects that an interface authenticator has been connected to the device. The interface authenticator may be detected by a check that is executed by the MC within the device when the link status state of the NC changes from off to on, sensing an electrical load or voltage, by detection of a signal being received by the device, or in other ways. At blocks 406 and 405, the interface authenticator and the device perform a set of operations that authenticate the interface authenticator device. In some examples, the interface authenticator produces a digital signature that is verified by the device. Various methods for the interface authenticator to be authenticated by the device are shown in FIG. 6 and the associated description below.

As a result of verifying that the interface authenticator is valid, at block 406 the device enables the performance of controlled commands on the device. Controlled commands may include commands that are not accessible when the interface authenticator is not connected to the device. In some examples, at block 408, the device enables a sideband data channel over which the controlled commands may be received. Examples of how the device enables the performance of controlled commands and examples of how the device enables sideband data are described in FIG. 5 and the associated description.

At block 410, the client computer system generates a controlled command to be sent to the device. At block 412, the client computer system transmits the controlled command to the device, and the controlled command is received by the interface authenticator. In some implementations, the controlled command is transmitted through the interface authenticator and is received by the device at block 418. In another implementation, the command is received by a processor on the interface authenticator, and the interface authenticator applies 414 a digital signature to the controlled command. In some examples, the digital signature may be generated using an encryption key generated as part of a key exchange process performed between the interface authenticator and the device. In other examples, the digital signature may be generated using a private encryption key associated with the interface authenticator. At block 416, after the controlled command has been signed, the signed controlled command is forwarded to the device.

At block 414, the device receives the controlled command from the client computer system via the network that includes the interface authenticator. In some implementations, controlled commands may be signed by the interface authenticator, and if the controlled command is signed, the device validates 420 the signature on the controlled command using the appropriate key. In various implementations, the appropriate key may be a key that is negotiated as part of the key exchange algorithm or a public key corresponding to the interface authenticator's private key. At block 422, the device fulfills the controlled command and generates a set of command results. At block 424, the results are returned to the client computer system via the network that includes the interface authenticator. At block 426, the interface authenticator relays the results to the client computer system, and at block 428, the client computer system receives the results of the controlled command.

In some implementations, the privileged command is signed at block 414. By signing the privileged command, the device is cryptographically assured of the origins of the privileged command, thereby preventing an injection attack or a man-in-the middle attack between the interface authenticator and the device.

Figure 5:
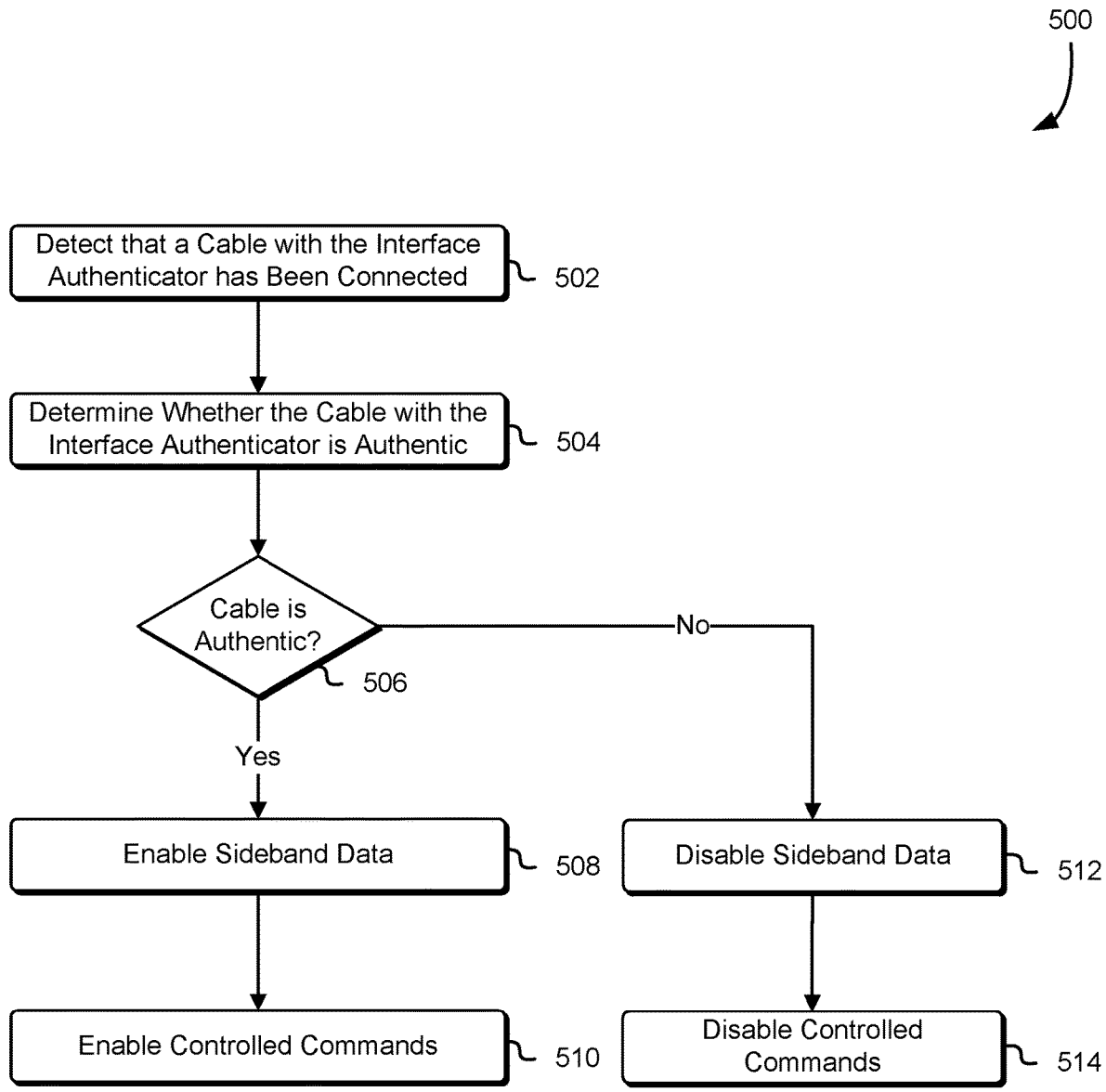
FIG. 5 illustrates an example of a process that, as a result of being performed by a device, validates the interface authenticator and allows a controlled command to be performed by the device, in an embodiment.

FIG. 5 illustrates an example of a process that, as a result of being performed by a device, allows controlled commands to be performed on the device, in an embodiment. In an embodiment, a process 500 begins at block 502 with a device determining that an interface authenticator has been connected. The interface authenticator may be detected by a check that is executed by the MC within the device when the NC link status state changes from off to on, detecting an electrical load, voltage, or current on a cable pin, by receiving a data signal via the cable, or otherwise. At block 504, the device determines whether the interface authenticator is valid by a cryptographic challenge-response authentication scheme verifying a digital signature provided by the interface authenticator and checking the validity period and current revocation status. In some examples, an authenticated cryptographically protected connection such as a TLS connection is created between the device and the interface authenticator, and a digital certificate provided by the interface authenticator is verified by the device. The interface authenticator sends a digital signature to the device, and the digital signature can be verified using a public key provided with the digital certificate. If the digital signature is valid, the interface authenticator is determined to be authentic.

At block 506, the device branches the execution sequence whether or not the interface authenticator is valid. If the interface authenticator is valid, the process advances to block 508 and the device enables a sideband data channel for pass-through access to the MC within the device. In some examples, the sideband data channel is enabled using a Network Controller Sideband Interface ("NC-SI"). NC-SI is an electrical interface and protocol defined by the Distributed Management Task Force ("DMTF"), which enables the connection of a Baseboard Management Controller ("BMC") to a set of Network Interface Controllers ("NICs") in server computer systems for the purpose of enabling out-of-band remote manageability.

At block 508, the device enables controlled commands to be performed by the device. Controlled commands may be enabled by a transition to the NC-SI channel ready state and subsequently accepting authentication credentials to the MC within the device writing an indication to a permission database on the device that controlled commands are enabled. When a command is received by the device, it is processed by a command processor. The command processor determines whether the command can be executed by consulting the permission database to determine if the particular command is allowed to be executed.

If the device determines that the interface authenticator is not authentic, execution advances to block 512. At block 512, the device disables any sideband data channel over which privileged commands may be received. At block 514, the device disables privileged commands from being performed on the device. Privileged commands may be enabled or disabled by storing authentication data on the device that indicates that any privileged commands that are attempted are to be ignored or canceled. In some embodiments, privileged commands are ignored, in other embodiments privileged commands are canceled, and in yet other embodiments, attempting to execute a privileged command while privileged commands are disabled returns an error code to the requester.

FIG. 6 illustrates an example of a process that, as a result of being executed by an interface authenticator and a device, determines if the interface authenticator is valid, in an embodiment. In an embodiment, a process 600 begins at block 602 and 604 where the interface authenticator and the device send and receive digitally signed certificates with corresponding public encryption keys. In some examples, the certificate chains use a data structure and defined format, such as X.509, to include the corresponding public encryption keys and other data elements that are generated during the provisioning process when the signer's certificates within the certificate chains are digitally signed with the trusted CA provisioning system's root private encryption key. At block 606, the interface authenticator retrieves a digital certificate from a memory stored on the interface authenticator and provides the interface authenticator's digital certificate to the device.

In some examples, the device proves that the interface authenticator generated a unique private encryption key and corresponding public encryption key with a digitally signed certificate, so each interface authenticator uses a secure integrated circuit, secure element or secure memory to prevent the cryptographic material from being copied or cloned. In some examples, the interface authenticator does not prove that the device was provisioned with a unique private encryption key and corresponding public encryption key with a digitally signed certificate, so there may be many devices that were provisioned with the same cryptographic material for the entire group of devices in the operational environment. In some examples, the interface authenticator does not authenticate the device. In some examples, the interface authenticator does not verify that the device is valid, for example to verify the validity period and also with a revocation check, at the time of operational use.

At block 608, the interface authenticator receives the digital certificate from the interface authenticator. The digital certificate is signed with a digital signature created by a manufacturer or other administrative entity with control over the distribution of interface-authenticator equipped cables. In an embodiment, the digital signature is generated with a private key of a private/public key pair. At block 610, the device validates the digital signature on the digital certificate using a public key associated with the manufacturer or other authority. If the signature is valid, execution advances to block 612 and the device requests a digital signature from the interface authenticator. In an embodiment, the device generates a challenge message to be signed by the interface authenticator. In another embodiment, the device requests a digital signature of a value that is based on the shared secret negotiated between the two entities. By signing a shared secret generated as part of a Diffie-Hellman key exchange, neither party has complete control over the value signed.

At block 614 the interface authenticator generates a digital signature of the shared secret (or challenge value) using a private key of the interface authenticator that corresponds to a public key contained in the interface authenticator's digital certificate. At block 616, the interface authenticator provides the digital signature to the device. At block 618, the device receives the digital signature from the interface authenticator. At block 620, the device validates the digital signature received from the interface authenticator using the public key in the interface authenticator's digital certificate.

Figure 7:
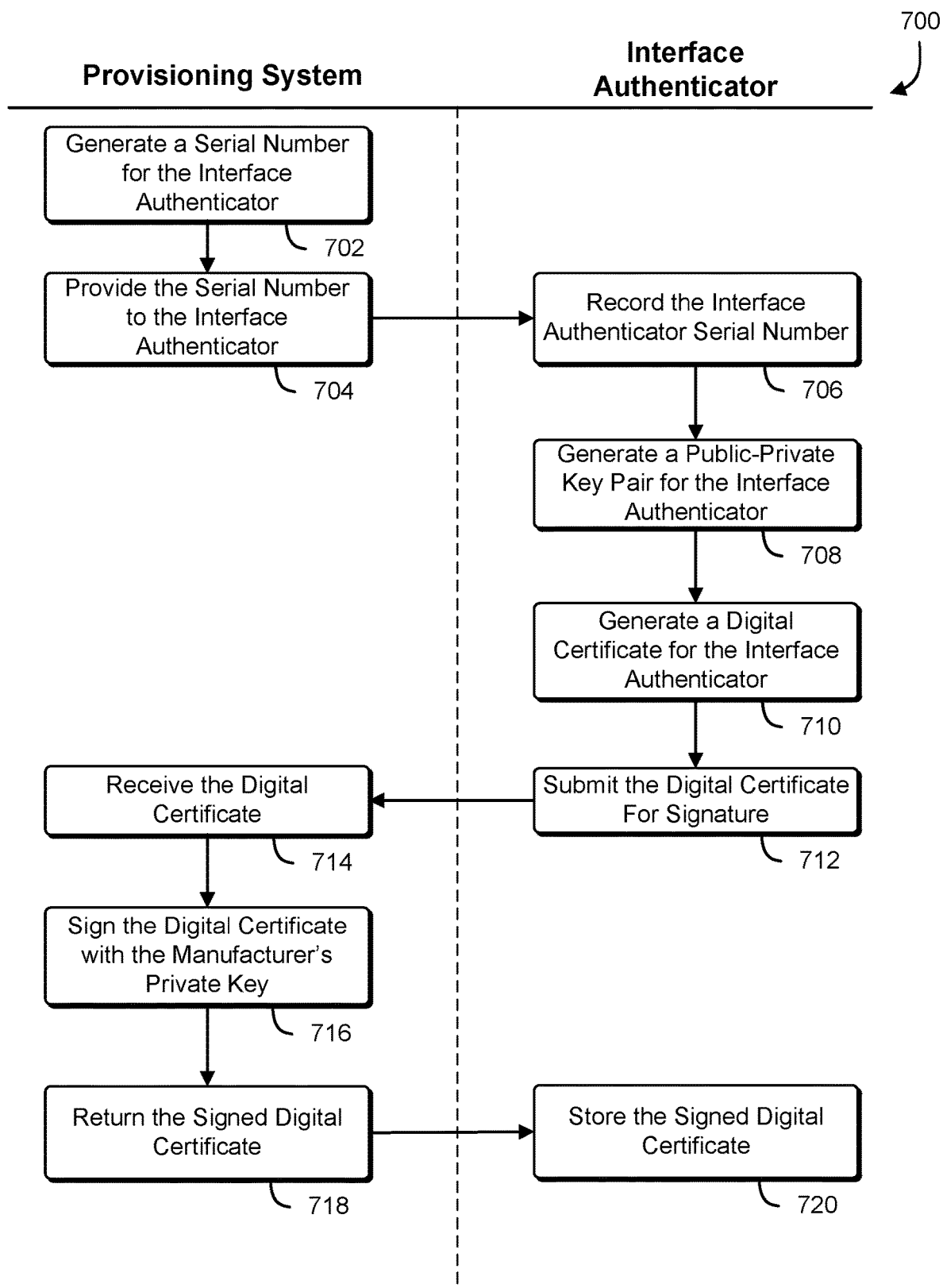
FIG. 7 illustrates an example of a process that, as a result of being executed by a provisioning system and an interface authenticator, configures an interface authenticator for use, in an embodiment.

FIG. 7 illustrates an example of a process that, as a result of being performed by a provisioning system and an interface authenticator, configures the interface authenticator for use, in an embodiment. In an embodiment, a process 700 begins at block 702 with a provisioning system generating a serial number for the interface authenticator being provisioned. At block 704, the provisioning system transmits the serial number to the interface authenticator.

At block 706, the interface authenticator receives the serial number from the provisioning system and records the serial number in a memory on the interface authenticator. At block 708, the interface authenticator generates a public-private key pair to be used in authenticating the interface authenticator. The public-private key pair is used to generate 710 a digital certificate which is stored in memory on the interface authenticator. The digital certificate includes public key of the private-public key pair. At block 712, the interface authenticator sends the unsigned digital certificate to the provisioning system.

At block 714, the manufacturer receives the unsigned digital certificate from the interface authenticator. After receiving the unsigned digital certificate, at block 716, the manufacturer signs the digital certificate with the manufacturer's private key (of the manufacturer's public-private key pair). At block 718, the provisioning system returns the signed digital certificate to the interface authenticator, and the interface authenticator stores 720 the signed digital certificate to a memory on the interface authenticator.

In some implementations, the cable manufacturer is different from the device manufacturer. In one example, the cable with the interface authenticator is purchased by the device manufacturer, and the manufacturer extracts identifying information and cryptographic information from the interface authenticator. The information is saved in a registration database by the manufacturer. As devices are manufactured, appropriate information is transferred from the registration database to each device so that each device can identify authenticated interfaces.

Figure 8:
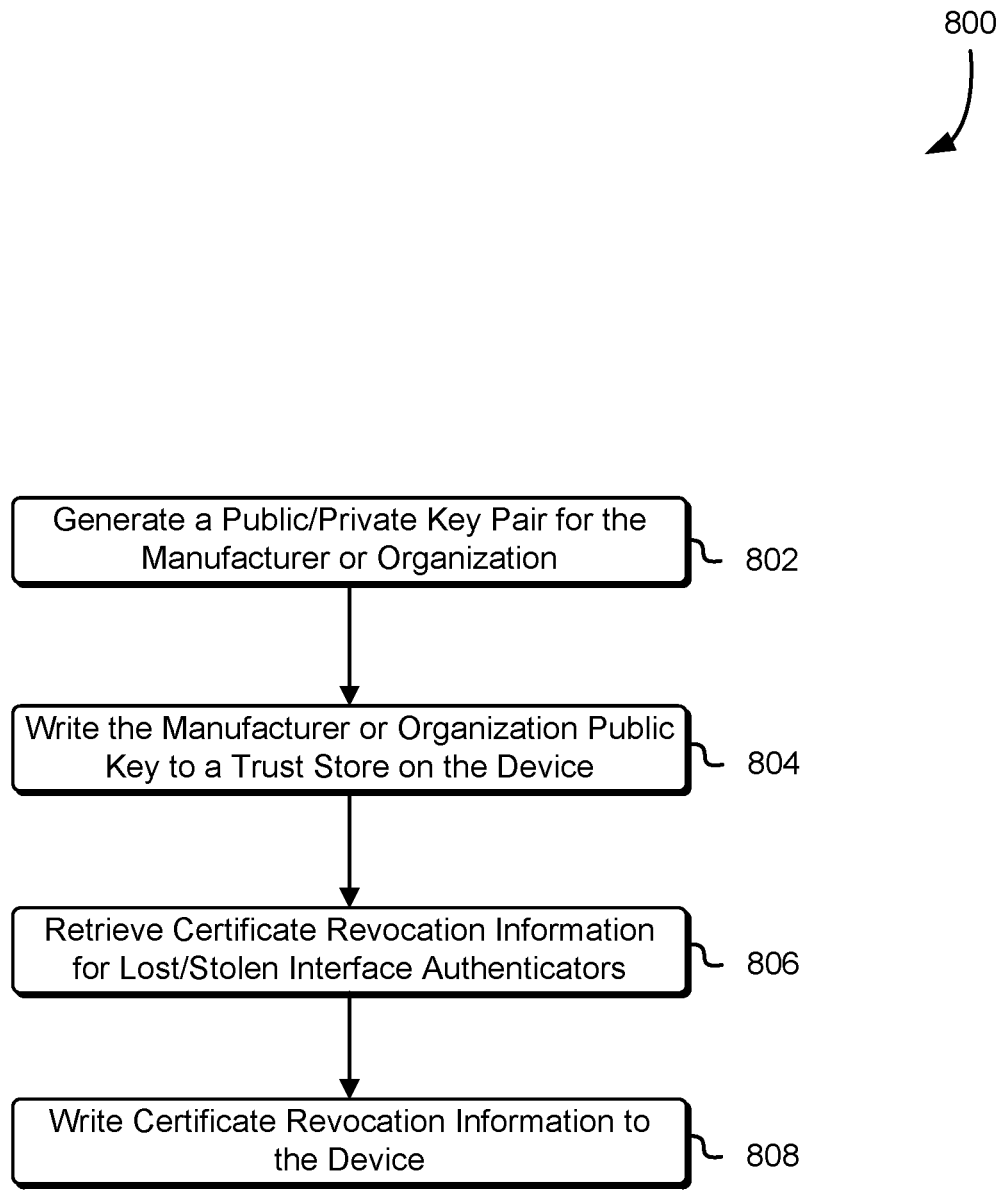
FIG. 8 illustrates an example of a process that, as a result of being performed by a device, registers an interface authenticator as valid for allowing controlled commands to be provided to the device, in an embodiment.

FIG. 8 illustrates an example of a process that, as a result of being performed by a device administrator, configures a device for use with an authenticated interface, in an embodiment. In an embodiment, a process 800 begins at block 802 where the manufacturer generates a public-private key pair to be used when signing digital certificates. At block 804, the manufacturer writes the public key of the key pair to a trust store on the device being manufactured so that the device can authenticate certificates provided by authenticated interfaces. At block 806, the manufacturer retrieves certificate revocation information for any lost or stolen authenticated interfaces, and the information is written 808 on the device.

In some implementations, the private key of the manufacturer is used to sign digital certificates generated by authenticated cables during the cable manufacturing process. The public key of the manufacturer in the certificate revocation information is written to memory on devices that are made to use with the authenticated interfaces, so that a device can determine whether a authenticated interface is authentic. In some implementations, the device may include the capability to download updated certificate revocation information from an online service. Certificate revocation information may be comprised of a list of compromised cable certificates, a list of compromised authenticated interface serial numbers, or other information that identifies one or more authenticated interfaces. If the authenticated interface is lost or otherwise compromised, the provisioning system may update this information so that new devices will not recognize the compromised authenticated interfaces.

Figure 9:
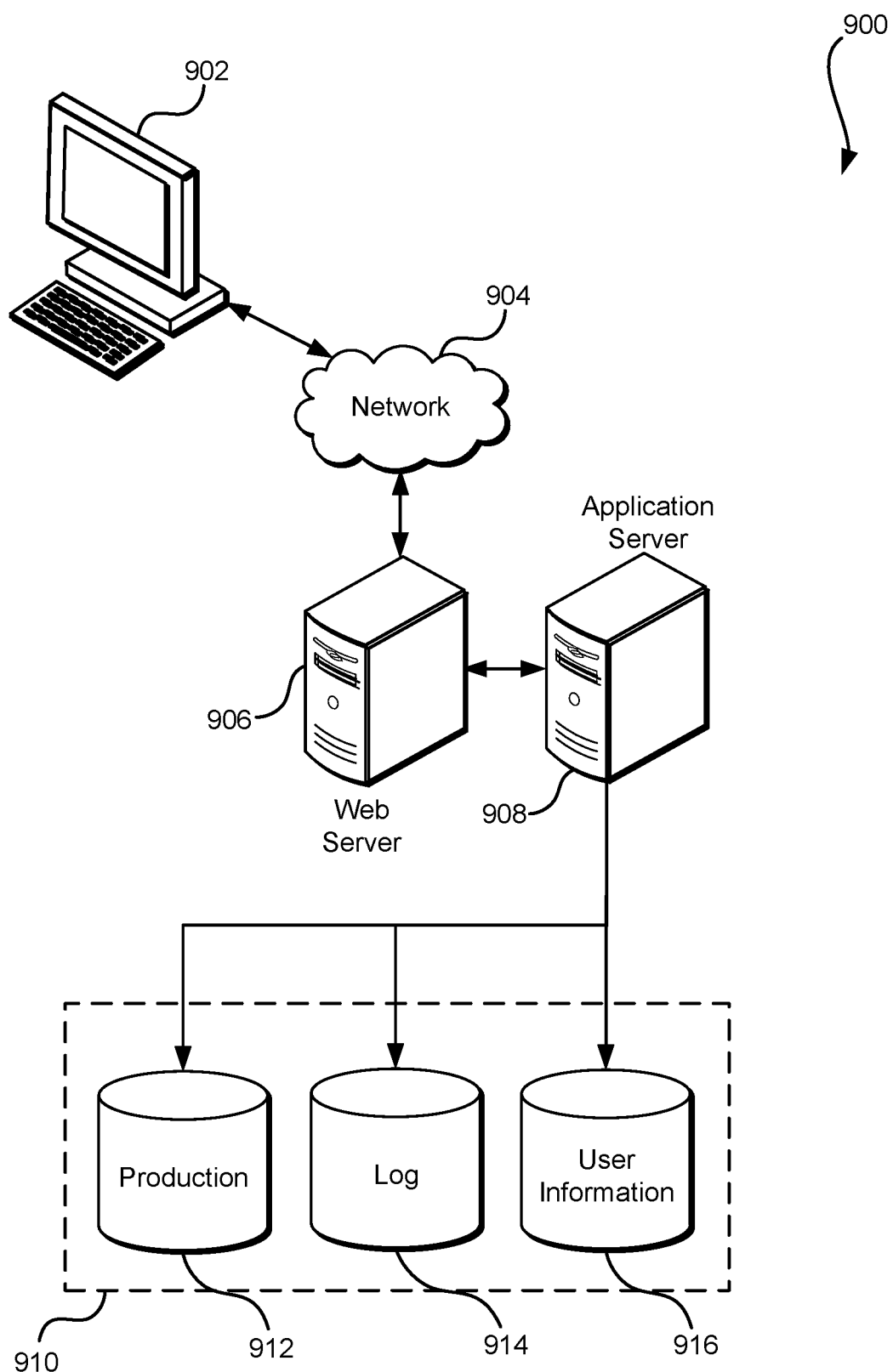
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface ("API") requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol ("TCP") connections and/or transport layer security ("TLS") or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of servers or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with or configured to receive a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard ("AES"), the data encryption standard ("DES"), triple DES ("3DES"), Serpent, Twofish, Bowfish, CASTS, RC4 and the international data encryption algorithm ("IDEA"). Symmetric key algorithms may also include those used to generate output of one-way functions and include algorithms that utilize hash-based message authentication codes ("HMACs"), message authentication codes ("MACs") in general, PBKDF2 and Bcrypt. Asymmetric key algorithms may also include various schemes for performing cryptographic operations on data. Example algorithms include those that utilize the Diffie-Hellman key exchange protocol, the digital signature standard ("DSS"), the digital signature algorithm, the ElGamal algorithm, various elliptic curve algorithms, password-authenticated key agreement techniques, the pallier cryptosystem, the RSA encryption algorithm ("PKCS #1"), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman ("ECDH") key agreement scheme, the Elliptic Curve Integrated Encryption Scheme ("ECIES"), the Elliptic Curve Digital Signature Algorithm ("ECDSA"), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm ("DSA") and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes ("HMACs")), keyed cryptographic hash functions, and other types of information may also be used as digital signatures.

Information may be said to be programmatically unexportable if there is no legitimate way to programmatically cause (e.g., through an interface of the device) the device to provide the information. The information may be maintained, for example, such that there is no request mechanism (e.g., application programming interface ("API") call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted, however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more encryption keys) for which extraordinary measures must be taken to obtain the information in plaintext form, if it is possible at all to obtain the information in plaintext form.

The short-range communication channel may be established using various technologies, such as induction wireless, infrared wireless (such as technologies operating according to specifications and protocols provided by the Infrared Data Association, or IrDA) or ultra wideband formats. In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and a microphone that enable the second device to receive the data embedded in the sound waves. Thus, one or more of radio signal-based data transfer (e.g., near field communication ("NFC") or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and, thus, need not be described in more detail herein. Generally, embodiments described herein are not limited to those explicitly illustrated herein.

Note that a system is said to be configured to trust a public encryption key if logic with which the system is configured to operate is dependent on whether an attempt to verify a digital signature with the public encryption key is successful. Similarly, a system is said to be configured to trust a symmetric encryption key if logic with which the system is configured to operate is dependent on whether an attempt to verify a digital signature with the symmetric encryption key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The encryption key used to encrypt and/or digitally sign the data object may vary in accordance with various embodiments, and the same encryption key is not necessarily used for both encryption and digital signing, where applicable. In some embodiments, an encryption key used to encrypt the data object is a public encryption key of a public/private encryption key pair where the private encryption key of the encryption key pair is maintained securely by the system to which the data object is to be provided, thereby enabling the system to decrypt the data object using the private encryption key of the encryption key pair. Using the public encryption key to encrypt the data object may include generating a symmetric encryption key, using the symmetric encryption key to encrypt the data object, and encrypting the symmetric encryption key using the public encryption key, where the encrypted symmetric encryption key is provided to a system with the encrypted data object to enable the system to use the corresponding private encryption key to decrypt the symmetric encryption key and use the decrypted symmetric encryption key to decrypt the data object. Further, in some embodiments, the data object is digitally signed using a private encryption key of a public/private encryption key pair corresponding to the computer system that encrypts and/or digitally signs the data object (e.g., a user device). For example, an application may be provisioned with the private encryption key, and the data object may include a certificate for the private encryption key for use by a system for verification of the digital signature of the data object. Other variations, including variations where a symmetric encryption key shared between the user computer and the system that cryptographically verifies the data object, can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein is merely intended to serve as a shorthand method of referring individually to each separate value falling within the range unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium stores instructions, and a main CPU executes some of the instructions while a graphics processor unit executes other instructions. In an embodiment, different components of a computer system have separate processors, and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    detecting that an authenticator is connected to a device, the authenticator including a processor and a memory that stores encryption key material;
    providing from the device to the authenticator, a request for validation;
    obtaining a digital signature from the authenticator, the digital signature generated by the processor using the encryption key material;
    verifying that the authenticator is valid based on an authentication scheme using the encryption key material with a challenge-response protocol;
    verifying an additional digital signature generated with a random cryptographic nonce challenge and a private encryption key corresponding to a public encryption key and a digitally signed certificate;
    enabling, at the device, a sideband data channel capable of receiving a set of secured commands;
    obtaining, at the device, via the sideband data channel, a secured command from a client computer system connected with the authenticator; and
    executing the secured command on the device.

2. The computer-implemented method of claim 1, further comprising:
    as a result of verifying that the authenticator is valid, permitting the set of secured commands to be executed by the device; and
    wherein the set of secured commands is not permitted until the authenticator is detected and verified to be valid.

3. The computer-implemented method of claim 1, wherein the device is prevented from obtaining the set of secured commands via a communication channel other than the sideband data channel.

4. The computer-implemented method of claim 1, further comprising:
   obtaining, from the authenticator, a digitally signed certificate associated with the authenticator, the digitally signed certificate including a public encryption key corresponding with a private encryption key that was generated by the authenticator;
   verifying validity of the digitally signed certificate;
   obtaining, from the authenticator, an additional digital signature generated with a random cryptographic nonce challenge and a private encryption key corresponding to the public encryption key and the digitally signed certificate; and
   verifying the additional digital signature using a trusted Certificate Authority ("CA") public encryption key, a validity period and a revocation status.

5. A device, comprising:
   a physical data interface that accepts commands that are in a first set of commands, and does not accept commands that are in a second set of commands;
   one or more processors; and
   memory that stores computer-executable instructions that, if executed, cause the device to:
      attempt to cryptographically validate an authenticator connected to the physical data interface by verifying a digital signature generated by the authenticator, the digital signature generated using a private encryption key stored on the authenticator;
      verify an additional digital signature generated with a random cryptographic nonce challenge and a private encryption key corresponding to a public encryption key and a digitally signed certificate; and
      as a result of determining that the authenticator is valid, cause the physical data interface to accept commands that are in the second set of commands.

6. The device of claim 5, wherein the computer-executable instructions, if executed, cause the device to further:
   obtain, from a memory on the authenticator, a digitally signed certificate that includes a public encryption key corresponding with the private encryption key on the authenticator;
   verify validity of the digitally signed certificate using at least a certificate authority root of trust public encryption key;
   obtain, from the authenticator, a digitally signed response to a random cryptographic nonce; and
   verify validity of the private encryption key using the public encryption key.

7. The device of claim 6, wherein the private encryption key stored on the authenticator corresponds to the public encryption key.

8. The device of claim 5, wherein the computer-executable instructions, if executed, cause the device to further:
   as a result of determining that the authenticator is valid, create a sideband data channel using the authenticator; and
   receive a command in the second set of commands via the sideband data channel.

9. The device of claim 5, wherein the computer-executable instructions, if executed, cause the device to further:
   perform a key exchange algorithm with the authenticator to produce a shared secret;
   generate a random cryptographic nonce challenge to be used during an interactive challenge-response authentication protocol;
   obtain, from the authenticator, a cryptographic hash response using the shared secret concatenated with the challenge; and
   verify validity of the authenticator by comparing the cryptographic hash response with an output of a cryptographic hash function on the device using at least the shared secret and the challenge.

10. The device of claim 9, wherein the key exchange algorithm is a Diffie-Hellman key exchange algorithm.

11. The device of claim 5, wherein the computer-executable instructions, if executed, cause the device to further obtain, via the authenticator, a command from the second set of commands, the command including an additional digital signature applied by the authenticator.

12. The device of claim 5, wherein:
   the device is a data storage device; and
   the second set of commands includes a command to format the data storage device, a command to securely erase data from the data storage device, or a command to encrypt data on the data storage device.

13. A non-transitory computer-readable storage medium having stored thereon executable instructions that, as a result of being executed by one or more processors of a computer system, cause the computer system to at least:
   verify a digital signature generated with a random cryptographic nonce challenge and a private encryption key corresponding to a public encryption key and a digitally signed certificate;
   cryptographically verify that an authenticator connected to the computer system is valid;
   as a result of having determined that the authenticator is valid, open a communication channel capable of receiving a controlled command; and
   authorize execution of controlled commands on the computer system.

14. The non-transitory computer-readable storage medium of claim 13, wherein the executable instructions further comprise instructions that, as a result of being executed by the one or more processors, cause the computer system to:
   obtain a digital signature from the authenticator, the digital signature generated with an encryption key retained in a memory on the authenticator; and
   verify the digital signature.

15. The non-transitory computer-readable storage medium of claim 14, wherein the digital signature is generated based in part on information that is provided to the authenticator from the computer system.

16. The non-transitory computer-readable storage medium of claim 13, wherein the executable instructions further comprise instructions that, as a result of being executed by the one or more processors, cause the computer system to:
   validate the identity of the authenticator; and
   establish an encrypted communication channel between the computer system and the authenticator.

17. The non-transitory computer-readable storage medium of claim 16, wherein the executable instructions further comprise instructions that, as a result of being executed by the one or more processors, cause the computer system to validate the identity of the authenticator by:
   obtaining a digitally signed certificate from a memory on the authenticator, the digitally signed certificate including a digital signature generated using encryption key material trusted by the computer system; and verifying the digital signature using the encryption key material.

18. The non-transitory computer-readable storage medium of claim 16, wherein the encrypted communication channel is established over a sideband data channel.

19. The non-transitory computer-readable storage medium of claim 16, wherein the executable instructions further comprise instructions that, as a result of being executed by the one or more processors, cause the computer system to provide cryptographic material to the authenticator that allows the authenticator to verify the identity of the computer system.

20. The non-transitory computer-readable storage medium of claim 13, wherein the computer system allows performance of a particular controlled command only if the particular controlled command is submitted via the communication channel.

* * * * *

UNITED STATES PATENT AND TRADEMARK OFFICE
CERTIFICATE OF CORRECTION

PATENT NO. : 11,050,570 B1
APPLICATION NO. : 16/198668
DATED : June 29, 2021
INVENTOR(S) : John Totah et al.

It is certified that error appears in the above-identified patent and that said Letters Patent is hereby corrected as shown below:

On the Title Page

Column 1, item (72) Inventor:
"John Totah, Half Moon Bay, CA (US)
Frank Charles Paterra, Kirkland, WA (US)
Stephen Wayne McKissick, Woodinville, WA (US)"

Should read:
--John Totah, Half Moon Bay, CA (US)
Frank Charles Paterra, Kirkland, WA (US)
Stephen Wayne McKissick, Woodinville, WA (US)
Bianca Nagy, Redmond, WA (US)--

Signed and Sealed this
Sixteenth Day of August, 2022

Katherine Kelly Vidal
*Director of the United States Patent and Trademark Office*